FIG. 4

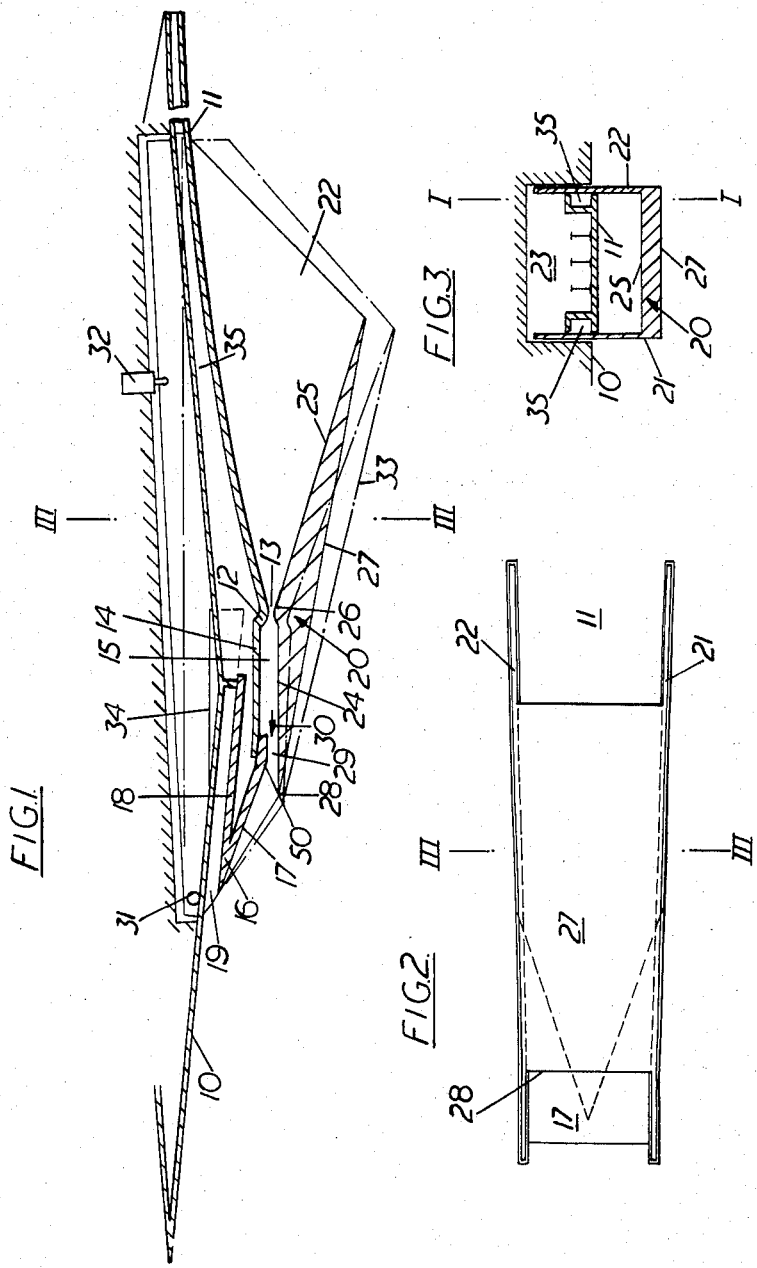

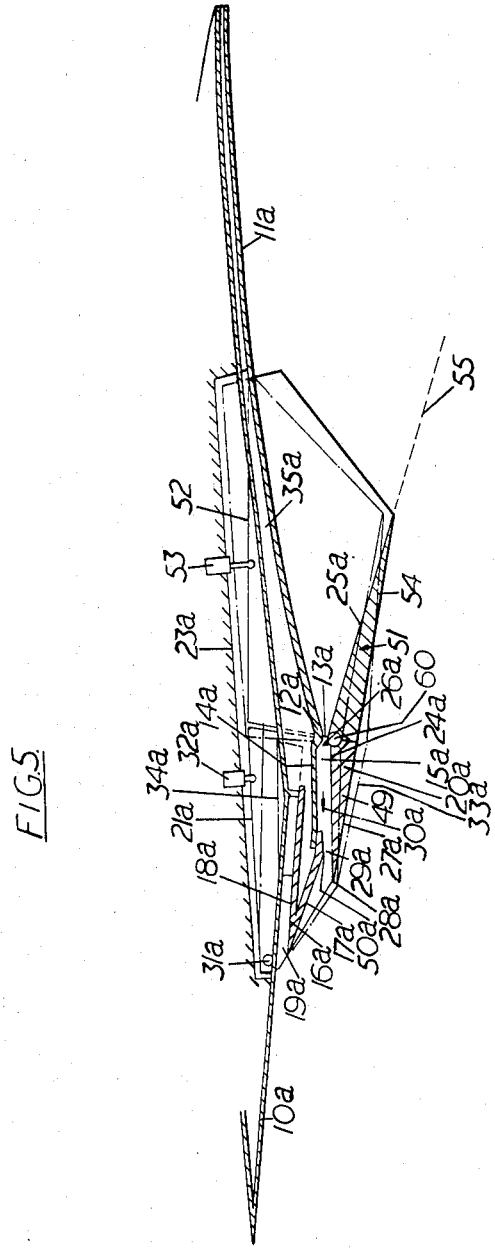

United States Patent Office 3,250,071
Patented May 10, 1966

3,250,071
RAMJET ENGINE
Noel Richard Hemming, John Brian Davis, Raymond John Lane, and Michael James Welch, Bristol, England, assignors to Bristol Siddeley Engines Limited, Bristol, England, a British company
Filed May 1, 1963, Ser. No. 277,152
Claims priority, application Great Britain, May 16, 1962, 18,864/62; Aug. 22, 1962, 32,262/62
8 Claims. (Cl. 60—35.6)

This invention relates to ram jet engines for the propulsion of vehicles at supersonic speeds. Such engines have been proposed taking the form of a duct having a convergent intake portion which is adjustable to vary the ratio of capture area to throat area, a combustion chamber portion wherein the air has a subsonic pre-combustion velocity, and a convergent-divergent expansion nozzle portion which is adjustable to vary the ratio of throat area to exit area.

As the flight Mach number increases, the compression ratio of the intake increases and results in changes in the pre-combustion Mach number. These changes have an appreciable effect on the combustion process, especially in engines required to operate over a wide range of flight Mach numbers.

According to the invention, a ramjet engine for operation through a wide range of supersonic and hypersonic speeds is in the form of a duct having an intake portion converging to an intake throat, a combustion chamber portion, and a convergent-divergent expansion nozzle portion including a nozzle throat, in which the walls of the duct are movable relatively to one another in order to change the intake throat area, the cross-sectional area of the combustion chamber at all points along its length, and the expansion nozzle throat area simultaneously in the same sense. A hypersonic speed is one at which the Mach number is more than 5.

Besides enabling the pre-combustion Mach number to be kept more constant, the reduction in combustion chamber cross-section at high flight speeds is accompanied by a reduction in surface area, and therefore of heat loss to the walls, which is of particular value at this time owing to the high operating temperatures then occurring.

In a preferred construction according to the invention, the ramjet engine comprises two opposite walls shaped to define the duct, and means for moving one of the walls relatively to the other, to change their spacing. The geometry of the engine may thus be varied in a relatively simple manner. Preferably, the movable wall is hinged to pivot about an axis transverse to the direction of air flow through the duct, and forward from the intake throat. In an alternative arrangement, both opposite walls may be movable independently.

The main factor governing the location of the hinge axis is to maintain a desired relationship between the changes of intake and expansion nozzle throat areas, but this relationship is itself subject to variation according to the values chosen for other factors, as for example whether the capture area and the fuel-to-air ratio are kept constant or are varied with flight Mach number.

A hinge axis position reasonably satisfying these requirements may leave an error in the longitudinal relationship of the convergent walls of the intake portion, resulting in unsuitable location of the shock wave system during some part of the flight regime. To enable this error to be corrected, according to a further feautre of the invention, one of the walls of the duct has a part defining part of the intake portion which is movable relatively to the remainder of the intake portion.

According to a still further feature of the invention, parts of the walls of the duct which define the expansion nozzle exit area are movable relatively to one another in order to change the exit area independently of the other variables. In the preferred arrangement according to this feature of the invention, one of two opposite walls defining the duct comprises two parts articuated or hinged together in the region of the expansion nozzle throat, and means are provided for moving these parts angularly relatively to each other. Preferably, it is the wall which is movable as a whole which comprises the two parts hinged together.

The invention is illustrated by the examples shown in the accompanying drawings. In these drawings:

FIGURE 1 is a partly diagrammatic longitudinal section through a ramjet engine for the propulsion of an aircraft through a range of speeds from Mach 4 to Mach 7;

FIGURE 2 is an underneath plan view of the main part of the engine, excluding the extremities of the intake and expansion ramps;

FIGURE 3 is a transverse section on the line III—III in FIGURES 1 and 2; and

FIGURE 4 is an airflow diagram of the intake shown in FIGURES 1 to 3, drawn to a larger scale than FIGURE 1;

FIGURE 5 is a longitudinal section corresponding to that shown in FIGURE 1 of a modified ramjet engine.

Figure 4:
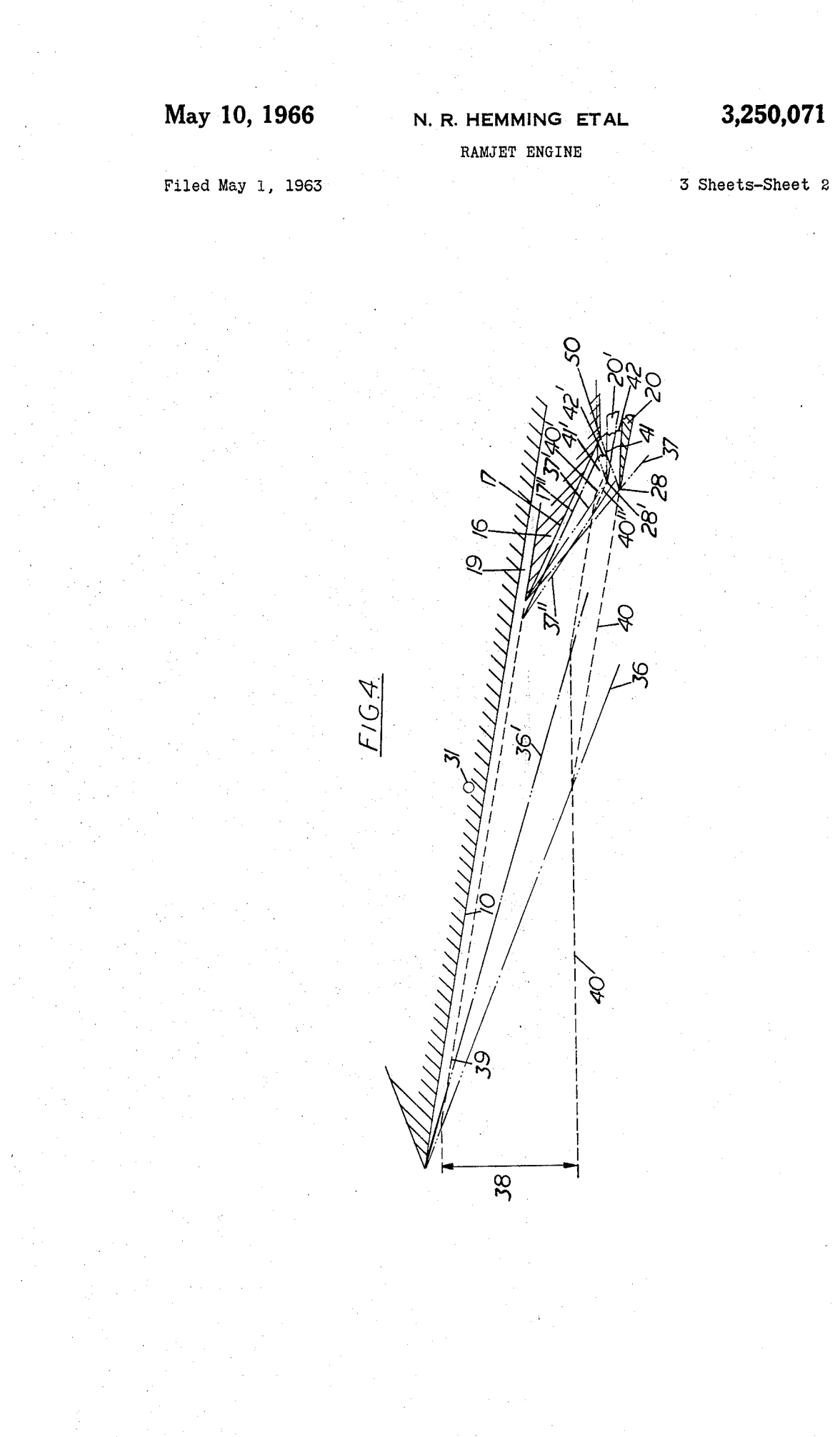

The engine shown in FIGURES 1 to 4 is mounted in a low aspect ratio wing of an aircraft suitable for flight at hypersonic speeds up to Mach 7. Part of the underside of the wing is used as an air intake ramp for the engine as indicated at 10 in FIGURE 1, and an expansion ramp 11 penetrates through the wing. The expansion ramp 11 extends forwards to a part 12 constituting an upper wall of a convergent-divergent nozzle throat 13 and to a part 14 constituting an upper wall of a combustion chamber 15. All these wall parts are fixed relatively to the aircraft structure. A member 16, mounted for fore and aft sliding movement on the combustion chamber wall 14 and on a rearward extension of the intake ramp 10, has a surface 17 which constitutes a secondary intake ramp, and a surface 18 spaced from the ramp 10 so as to form therewith a boundary layer air passage 19. A rectangular section channel-shaped member 20 has side walls 21 and 22 embracing the member 16, the combustion chamber wall 14 and part of the expansion ramp 11 and entering a recess 23 in the aircraft structure. The base wall of the member 20 is approximately triangular in longitudinal section, so as to provide a lower combustion chamber wall 24 connected to a lower expansion nozzle surface 25 by a throat-forming portion 26, and a lift-producing under surface 27. The combustion chamber wall 24 extends forwards to meet the under surface 27 at an intake lip 28, and to form an intake throat 29 with the downstream end 50 of the ramp 17. Downstream from the throat 29 the sliding member 16 steps back to the upper wall 14 of the combustion chamber, to form a so-called "dump-diffuser." Liquid fuel is sprayed into the combustion chamber 15 as indicated at 30.

The channel-shaped member 20 is shown in full lines in the position occupied for flight at Mach 7, and is connected to the fixed structure of the aircraft by a pivot 31 arranged forward of the intake throat 29 so that it can be turned by jacks 32 into the position indicated by the chain-dotted line 33, to adapt the geometry of the engine for flight at Mach 3, as will be more fully described.

The boundary layer air entering the passage 19 is discharged through openings 34 provided in the side walls 21 and 22 of the channel-shaped member 20, while air and combustion gases leaking through the working clearance between the side walls 21 and 22 and the upper wall parts 11, 12, 14 and 17 enter channels 35 and are discharged into a low pressure zone at the rear of the aircraft. Any possible recirculation of hot high pressure working fluid into lower pressure parts of the ramjet duct is thus avoided.

In FIGURE 4 the secondary ramp 17 and the lip 28 are shown in full lines in their positions for operation at a flight speed of Mach 4. At this speed shock waves 36 and 37 extend from the leading edges of the primary and secondary ramps 10 and 17 respectively, the shock wave 37 touching the lip 28. The capture area is therefore represented by the dimension 38 extending from the intersection of the boundary layer surface 39 with the shock wave 36 to a streamline 40 which, after being refracted on passing through the shock wave 36, strikes the lip 28. In this condition the size of the intake throat 29 is chosen in relation to intake form and flight Mach number so as to permit operation in the critical condition (a normal shock wave at the throat), and the cross-sectional area of the duct at the downstream end of the subsonic diffuser is chosen such that the pre-combustion Mach number of the air has a suitable value of, for example 0.3. At a flight speed of Mach 7 it is desired to have about the same capture area and not to allow the pre-combustion Mach number to fall below say 0.2. The latter requirement can be fulfilled, together with an appropriate change of exhaust nozzle throat area, based for example on a fuel-to-air ratio increasing to the stoichiometric value at maximum flight Mach number, by turning the outer wall of the member 20 about the pivot 31 to the position shown in chain dotted lines at 20'. If, however, no change is made in the position of the secondary ramp 17, the shock wave 41' from the cowl lip at 28', which corresponds to the shock wave 41 from the cowl lip at 28, will not strike the downstream end 50 of the secondary ramp 17, and this will set up an undesirable shock system within the intake. To prevent this, the member 16 is moved forwards to bring the ramp surface 17 to 17", and its shock wave 37' to 37", so that the shock wave 41' strikes the end 50 of the secondary ramp 17, and incidentally so that the new position 40" of the streamline 40' touches the lip at 28'.

Thus when operating at a flight speed of Mach 4 an oblique shock wave 31 extends from the lip 28 and touches the downstream end 50 of the secondary ramp 17, a normal shock wave 42 being formed in the throat at the transition from supersonic to subsonic velocity. At a flight speed of Mach 7 the shock wave 41 moves to 41' and the normal shock wave 42 to some such positions at 42', the positions of the normal shock waves being dependent upon the fuel supply in known manner.

FIGURE 5 shows a modified ramjet engine, corresponding parts of which are referred to by the same numerals as in FIGURES 1 to 4, but with the addition of the suffix "a." In this modified construction, the channel shaped member 20a comprises two parts, a forward part 49 and a rear part 51, hinged about a hinge 60 in the region of the expansion nozzle throat 13a. The rear part 51 of the channel shaped member 20a has a base wall which provides a lower expansion nozzle surface 25a. The side walls 52 of the rear part 51 enter the recess 23a. Jacks 53 enable the rear part 51 to be turned about the hinge 60, so as to alter the angular relation between the parts 49 and 51.

At Mach 7 the part 51 is in the position shown in full lines in FIGURE 5, in which its under surface 54 is in alignment with the under surface 27a of the part 49. Maximum lift is thereby obtained from the under surfaces 27a and 54, and base drag from the projecting engine structure is avoided by reason of the fact that the lower streamline 55 of the discharge from the nozzle is inclined downwards. At lower flight Mach numbers, the part 51 is swung upwards by the jacks 53 to reduce the exit area, and there is a decrease in the inclination of the lower streamline 55 of the discharge from the nozzle, but base drag from this cause does not appear until the streamline becomes deflected upwards, which is liable to occur at intermediate speeds with some engine nozzle arrangements.

We claim:
1. A ramjet engine comprising walls defining a duct, said duct having intake lips at the forward edge of said walls and an intake portion converging to an intake throat, a combustion chamber portion, and a convergent-divergent expansion nozzle portion including a nozzle throat, at least a first one of said walls being mounted to pivot about a single pivot axis placed forwardly of said intake lips, at least one of said walls including means for articulating said wall.

2. A ramjet engine according to claim 1 in which the wall parts defining the intake portion include a primary ramp and a secondary ramp for supersonic compression, and means for moving the secondary ramp forwards relatively to the primary ramp with increasing Mach number and vice versa.

3. A ramjet engine according to claim 1 in which the wall parts defining the intake portion include a primary ramp and a secondary ramp for supersonic compression, and means mounting the secondary ramp for movement backwards and forwards relative to the primary ramp.

4. In a ramjet engine as claimed in claim 1, said pivot axis being located rearwardly of the front end of the primary ramp.

5. The structure of claim 1, wherein the articulation is located, with respect to the longitudinal dimension of the duct, at the nozzle throat.

6. The structure of claim 5 wherein the articulation point is a pivot axis located in the articulated wall.

7. A ramjet engine comprising walls defining a duct, said duct having intake lips at the forward edge of said walls and an intake portion converging to an intake throat, a combustion chamber portion, and a convergent-divergent expansion nozzle portion including a nozzle throat, at least a first one of said walls being mounted to pivot about a single pivot axis placed forwardly of said intake lips, the wall parts defining the intake portion including a primary ramp and a secondary ramp for supersonic compression, and means for moving the secondary ramp longitudinally of the duct with respect to the primary ramp.

8. A method of operating a ramjet engine at speeds above Mach 1, which engine includes walls defining a duct having an intake portion including an intake ramp system and a lip, and converging to an intake throat, a combustion chamber portion and a convergent-divergent expansion nozzle portion including a nozzle throat, which comprises moving one of said walls of the duct bodily relative to the remainder for changing simultaneously the intake throat area, the cross-sectional area of the combustion chamber portion at all points along its length, and the expansion nozzle throat area in the same sense, to reduce all of said areas with increases in the Mach number and vice versa, and simultaneously maintaining the capture area of the intake ramp system and lip substantially constant throughout a range of flight Mach numbers at least up to 5.

References Cited by the Examiner
UNITED STATES PATENTS

| | | | |
|---|---|---|---|
| 1,725,914 | 8/1929 | Hallowell | 60—35.6 |
| 2,700,515 | 1/1955 | Reder. | |
| 3,017,140 | 1/1962 | Barnard | 60—35.6 X |

MARK NEWMAN, *Primary Examiner.*

SAMUEL LEVINE, DONLEY J. STOCKING,
*Examiners.*

T. BLUMENSTOCK, R. D. BLAKESLEE,
*Assistant Examiners.*